March 14, 1939.  J. B. EISEN  2,150,212
METHOD OF MAKING CENTER SPOT CROWNS
Filed July 14, 1936
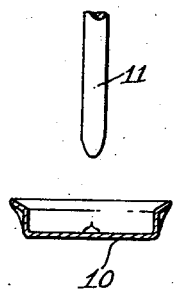
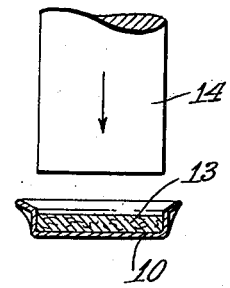
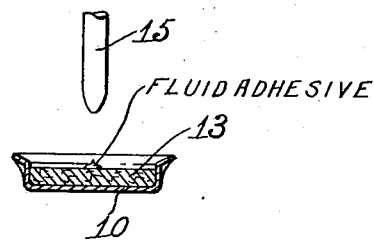
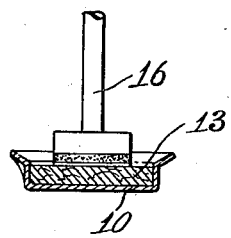
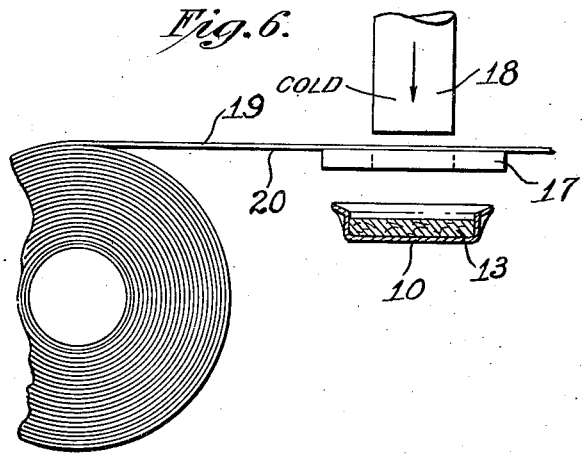
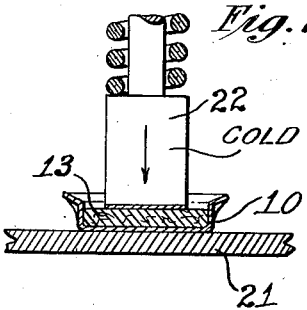
Jay Bernard Eisen
INVENTOR
BY
ATTORNEY.

Patented Mar. 14, 1939

2,150,212

UNITED STATES PATENT OFFICE 2,150,212

METHOD OF MAKING CENTER SPOT CROWNS

Jay Bernard Eisen, Yonkers, N. Y., assignor to Ferdinand Gutmann & Co., Brooklyn, N. Y., a corporation of New York Application July 14, 1936, Serial No. 90,464

7 Claims. (Cl. 113—80)

The invention relates to a method of making center spot crowns, and more particularly to a procedure by which the center spot discs may be firmly adhered to the cushion disc of a crown without applying heat to the adhesive during the bonding of the center spot disc to the cushion disc.

Prior to the present invention, the practice for many years in the production of center spot crowns has been to cut the center spot discs from a strip of facing material having associated therewith or applied thereto, a heat fusible adhesive in a dry state, and applying heat to the center spot material and therethrough to the adhesive simultaneously with the depositing of the center spot disc upon the cushion disc of a crown. This practice was followed because it was necessary to secure an initial bond between the center spot disc and the cushion disc immediately upon the application of the center spot to said disc, in order to avoid displacement of said spot between the time that it was deposited upon the cushion disc and the time that the completely assembled structure was delivered to the finishing head or pressure drum. In some instances, further heat was applied to the assembly in order to secure a stronger bond between the center spot and the cushion discs. In some instances, a heated cutting die was used, and the heat for fusing the adhesive was transmitted from the heated cutting die through the material of the center spot disc to the adhesive. In other instances, the practice was to heat the cushion disc of the crown prior to the depositing of a cold disc thereon by means of a cold cutting and plunger die.

When the center spots were of a metal foil, such as aluminum or tin, heat was rapidly conducted to the adhesive so as to permit the operation of the spotting machine at the high speeds necessary to make the method commercial. When pre-heating the cushion discs when a cold plunger die was used in cutting the center spot discs from a strip, it has been found necessary to subject the caps, with the center spot thereon, to an elevated temperature between the application of the center spot discs to the cushion disc and the delivery of the completely assembled crown to the finishing drum.

With the use of adhesives having a low melting point, such as gutta-percha and some resinous adhesives, no difficulty was experienced in properly conditioning the adhesive by the transmission of heat thereto through the center spot material, whether the material of this spot were a metal foil or a finished paper. With adhesives having a higher melting point, or one approaching 170° to 180° F., great difficulty was experienced in conditioning these adhesives when a finished paper spot was to be applied to the cushion disc. This is due to the difficulty of transmitting heat through paper to the adhesive with sufficient rapidity to permit the operation of the spotting machine at normal speeds.

I have found by experiment, that the use of heat for conditioning the adhesive between the center spot disc and the cushion disc is unnecessary, and have devised the herein described method by means of which the heating of any part of the spotting machine is unnecessary, and yet avoid side slipping of a center spot disc upon its initial application to a cushion disc to an extent to limit the number of imperfect caps due to a displacement of the center spot disc or its positioning off center to an extent to interfere with the proper sealing of a bottle.

By applying center spot discs to the cushion discs of crowns without the use of heat, the adhesive takes a final set more rapidly than when heat fusible adhesives are used, and the bond between the center spot disc and the cushion disc is stronger and firmer when the crowns leave the final pressure stage than when a setting of the adhesive is dependent upon its cooling after leaving the pressure stage.

A cold method also has the advantage that it reduces likelihood of mutilation of the decoration upon the metal shell which, in machine handling, is apt to be scraped when the crown is at a fairly high temperature during its passage through the spotting machine.

With the above conditions in mind, I have developed a method of making center spot crowns without the use of heat, in which the facing material is bonded to the cushion disc of the crown by combining in a single homogeneous stratum, a dry adhesive carried by and bonded to the strip material from which the vehicle has been evaporated or otherwise eliminated, and the same adhesive in a fluid condition distributed in a thin film upon the exposed face of the cushion disc. By using a thin film of a fluid adhesive having a volatile solvent, enough of this solvent will evaporate with sufficient rapidity to make the adhesive stratum tacky, so that it will be firmly bonded to the material of the cushion disc prior to the depositing of the coated center spot material upon the fluid adhesive upon the cushion disc, and the vehicle of the fluid adhesive reacts with the dry adhesive upon the center spot to make it tacky. Hence two tacky surfaces are brought together, thus not only avoiding side slipping of the center spot upon the cushion disc, but securing an initial bond sufficiently strong to preclude side slipping of the center spot to an extent to interfere with the commercial production of such caps.

With a highly viscous adhesive such side slipping makes the commercial production of such caps impossible.

The final bond between the center spot and the disc results from the evaporation or volatilization of the vehicle of the fluid adhesive applied to the cushion disc. A thin stratum of adhesive between the spot and the disc and continuity of this stratum are both highly desirable. The presence of fluid adhesive upon the cushion disc permits the application of a very thin stratum of dry adhesive upon the strip material for the center spots without regard to the complete coverage of such material with the adhesive during its application to the stratum.

Since the setting of the adhesive results from the hardening the body of the adhesive due to a complete dispersion and evaporation or volatilization of the vehicle of the fluid adhesive applied to the cushion disc, the cap, after the deposit of the center spot upon the cushion disc, may be subjected to a continuing cold pressure. The adhesive upon the cushion disc and carried by the spot material, during the initial application of this pressure, will be sufficiently soft and tacky to ensure a substantially uniform bond throughout the entire area of the center spot to the cushion disc. While the ultimate final bond is between the center spot material and the cushion disc, during the initial bonding action and during the drying out stage or setting of the adhesive the bond results from the combining or amalgamation of the adhesive bonded to the strip and the liquid adhesive bonded to the cushion disc. The total thickness of the stratum between the center spot and the cushion disc in the finished crown may be between .001 and .003 of an inch.

While the dry adhesive upon the strip material has sufficient tenacity and flexibility to prevent flaking of the adhesive from the facing material and is not brittle, there is always possibility, during the coating of the adhesive upon the strip, that the adhesive may not cover isolated portions of the strip unless extreme care is used during the coating operation, and should these bare spots occur at points adjacent the edge of the center spot discs cut therefrom, there might be a failure of the bond at the edge of the spot which is highly undesirable, since it may lead to the stripping of the spots from the cushion disc while the crowns are being tumbled in the hopper of a capping or filling machine. The presence of a fluid adhesive of the same nature upon the center spot prevents the production of crown having this defect.

By using a dry adhesive having characteristics of pliability and toughness or tenacity, the condition of the coated strip is such that center spot discs having clean cut edges may be severed from the strip.

If too great a volume of fluid is deposited upon or dispersed about the central portion of the cushion disc, a small quantity of this adhesive may be expressed when pressure is applied to the center spot, but this is immaterial since the adhesive used does not become tacky when subjected to water or water vapors and will not be granulated or reduced to small particles during the tumbling operation in applying the caps to the bottles or other containers. Consequently, there can be no fouling of the neck of the bottle by adhesive upon the cushion disc and no adherence of the cushion to the neck of the bottle from this cause, since the adhesives used are of a nature which will not soften or become tacky when subjected to pasteurization or sterilization temperatures.

A heat fusible and soluble adhesive may be used, but it must have a high melting point, so that during pasteurization or sterilization of the contents of a container, the heat to which the container is subjected will not soften the adhesive. Heat fusibility of the adhesive, however, is no factor in the practice of the method of the invention.

The invention consists primarily in a method of making center spot crowns embodying therein the feeding of a strip of facing material in relation to cold cutting dies including a plunger die, said facing strip having on the under side thereof a coating of soluble adhesive from which the vehicle has been removed, the distribution about the center of a cushion disc in a fluid form of a film of adhesive having a highly volatile vehicle which will react with the adhesive upon said strip, cutting a center spot disc from said strip and depositing it upon the portion of the cushion disc having said fluid adhesive applied thereto, applying pressure to said center spot disc when depositing it upon said cushion disc, and thereafter applying a continuing pressure to said center spot disc by a presser plunger maintained at normal factory temperatures, whereby said center spot disc is applied to said cushion disc without subjecting the adhesive to an elevated temperature; and in such other novel steps and practices as are hereinafter set forth and described, and more particularly pointed out in the claims hereto appended.

Referring to the drawing,

Fig. 1 is a view showing the delivery of an adhesive to the metal shell of a crown;

Fig. 2 is a view showing the application of heat to evaporate sufficient of the vehicle of said adhesive to make it tacky;

Fig. 3 shows the step of depositing a cushion disc within said metal shell upon the tacky adhesive;

Fig. 4 is a view showing the application, centrally of the cushion disc, of a fluid adhesive;

Fig. 5 is a view showing the spreading or dispersing of said fluid adhesive throughout the central portion of the disc;

Fig. 6 shows the step of cutting a center spot from a strip of facing material and applying it to the cushion disc; and Fig. 7 shows the final stage wherein the assembled structure is subjected to cold pressure when making a permanent bond between the center spot disc and the cushion disc, and between the cushion disc and the metal shell.

Like numerals refer to like parts throughout the several views.

In the practice of the method of the invention, two procedures may be followed. The first of these is the cementing of the cushion disc to the metal shell and the bonding of the center spot to the cushion disc by a continuing operation of the same machine. The other is the cementing of the cushion disc to the metal shell of the crown in one machine, and the subsequent application of the center spot to the cushion disc in a second machine. The first procedure has the advantage that it requires but one handling of the crown and thus reduces likelihood of the mutilation of the decoration upon the crown. The absence of heat also reduces likelihood of mutilation of the decoration. The first procedure also permits the production of the crown more economically, but this procedure, per se, has long been in use.

In describing the method of the invention, I will first describe the first procedure above referred to. During this procedure, a drop of a suitable cement, such as casein, is deposited in the metal shell 10 of a crown. The vehicle of this adhesive is then driven off sufficiently to make the adhesive tacky. In the drawing, the evaporation of this vehicle is shown as being accomplished by the application of heat thereto. The cement is deposited in the shell by an ordinary dropper 11, and the source of heat in Fig. 2 is shown at 12.

When the drop of cement is sufficiently tacky, a cushion disc 13 of any desired material, ordinarily natural or composition cork, is positioned within the shell upon the tacky adhesive by a cork feeding mechanism shown conventionally at 14. The three steps above referred to have long been used in assembling a cushion disc within a metal shell.

After the placing of the cushion disc 13 in the metal shell 10, I distribute a fluid adhesive having a highly volatile vehicle upon the central portion of the exposed face of the disc. This is done by flowing a small volume of the adhesive from a dropper 15 upon the surface of the disc, as shown in Fig. 4, and immediately thereafter spreading or dispersing this vehicle by means of a spreader shown conventionally at 16 in Fig. 5 of the drawing. The amount of adhesive thus delivered is such as to form a thin film, from .001 to .002 of an inch in thickness.

Following the spreading of the adhesive, sufficient of the volatile vehicle will be eliminated to cause the bonding of the adhesive to the cork or other material of the cushion disc. In fact, the whole volume of the adhesive becomes tacky almost immediately.

After the distribution of the fluid adhesive upon the face of the cushion disc, the crown is brought below a pair of cutting dies 17 and 18, the latter of which is a plunger die which has the two-fold function of co-operating with the die 17 for cutting a center spot disc from a strip 19 of facing material and pressing the spot so cut into momentary contact with the adhesive upon the cushion disc.

The strip material 19 which is intermittently fed in relation to the dies 17 and 18, has the under face thereof, as shown in Fig. 6 of the drawing, coated with the same adhesive deposited upon the cushion disc, except that the vehicle has been removed from this adhesive so that it is in a dry state.

In actual practice, I have found a nitro-cellulose derivative adhesive containing a synthetic resin gives highly satisfactory results using as a vehicle for this adhesive either ethyl acetate alone or an admixture of 50% of ethyl acetate and 50% toluene.

When a thin film of the adhesive is distributed upon the surface of a cushion disc, it becomes tacky so rapidly that when a center spot coated with a dry adhesive having the same solid constituents as those in the fluid adhesive applied to the cushion disc, is pressed upon the adhesive upon the cushion disc, there is little or no tendency of side slipping of the center spot to an extent to result in the center spot being off center sufficiently to make the crown unusable. In the drawing, the coated facing of the strip is indicated at 20.

The vehicle of the fluid adhesive will be absorbed by, or penetrate the dry adhesive upon the center spot following the application of the center spot to the cushion disc, causing the adhesive upon the cushion disc and the adhesive upon the center spot to combine or amalgamate so as to form a single homogeneous stratum of the adhesive in the finished product. The distribution of the vehicle will also result in a rapid setting of the adhesive.

Immediately following the pressing of the center spot disc upon the cushion disc, the crown is conveyed from adjacent the dies 17 and 18 to the collecting drum shown conventionally at 21.

With the initial contact of the dry adhesive bonded to the center spot with the tacky fluid adhesive bonded to the cushion disc, the center spot will adhere with sufficient tenacity to avoid displacement of the spot while it is being conveyed as above described.

While the crown is in the collecting drum, it is subjected to a continuing pressure from a spring pressed plunger 22 for a time interval sufficient to permit evaporation or volatilization of the vehicle carried by the fluid adhesive and absorbed by, or transferred to, the dry adhesive, thus causing the setting or hardening of the adhesive while the pressure is maintained. In this manner, a firm final bond is secured between the center spot and the cushion disc and between the cushion disc and the crown.

The dies 17 and 18 has no heat applied thereto, these dies always being cold or at normal factory temperatures. The collecting drum 21 and the plungers 22 are also cold or maintained at normal factory temperatures.

Throughout the method described, no heat is required beyond that from the burner 12, and this is only a momentary heat for the purpose of rapidly driving the vehicle from the cement used for securing the cushion disc to the metal shell. If desired, cements may be used which do not require the application of heat in this stage.

After the depositing of the center spot upon the cushion disc and while a continuing pressure is being exerted thereon in the collecting drum, the extent of penetration of the vehicle into the body of the dry adhesive increases even during that evaporation or volatilization of the vehicle which results in the setting of the adhesive. The pressure may be continued for from eight to ten seconds, during which time sufficient of the vehicle evaporates or is absorbed by the adhesive to ensure a firm permanent bonding of the center spot upon the cushion disc. This pressure is merely sufficient to press the spot firmly against the cushion disc, twelve to fourteen pounds being adequate.

After the discharge of the crown from the collecting drum, the elimination of the vehicle may continue for an indefinite period, although this action is not certain. As a matter of fact, however, I have found that after leaving the drum the strength of the bond between the center spot and the cushion disc is sufficiently great to permit the commercial use of the crowns.

In the second procedure above referred to, the crowns are completely assembled in one assembling machine and the center spot is applied to the cushion disc by means of a second machine;

in which the steps shown in Figs. 4 to 7 only are carried out.

The time intervals required in practicing the method by the procedure first above referred to may require modification of machines now commonly used. The second procedure may be followed using two assembling machines long used in this industry having the necessary attachments applied thereto.

The pressure in the final stage will have a tendency to force the tacky fluid adhesive toward the edge of the center spot, since the pressure from the plunger 22 is applied throughout the entire area of the center spot. This will ensure a firm bonding of the center spot about the edge thereof to the cushion disc. It is highly desirable that the edge have a firm intimate contact with, and be bonded to, the cushion disc. The likelihood of any of the fluid adhesive being extruded from between the center spot and the cushion disc is so small that the possibility of the adhesive extending beyond the spot is practically negligible. This is due to the fact that the fluid adhesive becomes tacky almost immediately following the spreading operation because of the thinness of the film of the adhesive. Such vehicle as remains in the adhesive will be absorbed by, or transferred to, the dry adhesive upon the center spot so as to make the outer surface of this adhesive tacky.

After the application of the fluid adhesive to the center spot, the procedure is such as to rapidly decrease the fluidity of this adhesive by the evaporation or volatilization of the vehicle and the absorption by, or transfer of, the vehicle to the dry adhesive. Hence, fouling of the neck of a bottle by the adhesive, or sticking of the cushion disc to the neck of the bottle will not result. If a cellulose derivative adhesive is used, the temperature of pasteurization or sterilization will not soften the adhesive or cause it to adhere to the neck of the bottle.

By applying the adhesive to the cushion disc, possibility of the fouling of the dies 17 and 18 is avoided and accuracy in the positioning of each center spot is assured.

There is a wide selection of adhesives which may be used in the coating 20. It is essential, however, that this adhesive be of a nature to become sufficiently dry upon the elimination of the vehicle to avoid the adherence of one convolution of a roll of such material to the adjacent convolution in a manner to interfere with the free run of the strip from the roll at normal factory temperatures. The time intervals are not critical.

It is not my intention to limit the invention to the specific adhesive herein described, it being obvious that other adhesives having a highly volatile vehicle may be used.

By the practice of the method, what in the finished crown is a homogeneous stratum of an adhesive, is formed by the combining of a thin stratum of fluid adhesive bonded to the cushion disc, and a thin stratum of a dry adhesive bonded to the center spot, the two being combined as a result of the action of the vehicle of the fluid adhesive upon the dry adhesive. The fluid adhesive is tacky when a center spot is applied to a cushion disc. The dry adhesive affords an anchorage surface much more effective than metal foil or finished paper.

I have been unable by experiment with adhesives of the character herein referred to, to satisfactorily bond a center spot to the cushion disc without the use of a dry adhesive upon the under face thereof. The application of a solvent to this dry adhesive prior to depositing a center spot upon the tacky adhesive carried by the cushion disc has not been found to give results more satisfactory than when this practice is not followed.

Having described the invention, what I claim as new and desire to have protected by Letters Patent, is:

1. A method of making center spot crowns embodying therein the feeding of a strip of facing material in relation to cold cutting dies including a plunger die, said facing strip having on the under side thereof a coating of soluble adhesive from which the vehicle has been removed, the distribution about the center of a cushion disc in a fluid form of a film of adhesive having a highly volatile vehicle which will react with the adhesive upon said strip, cutting a center spot disc from said strip and depositing it upon the portion of the cushion disc having said fluid adhesive applied thereto, applying pressure to said center spot disc when depositing it upon said cushion disc, and thereafter applying a continuing pressure to said center spot disc by a presser plunger maintained at normal factory temperatures, whereby said center spot disc is applied to said cushion disc without subjecting the adhesive to an elevated temperature.

2. A method of making center spot crowns embodying therein feeding a strip of facing material in relation to cold cutting dies including a plunger die, said facing strip having on the under side thereof an adherent coating of a dry adhesive soluble by ethyl acetate, distributing about the center of a cushion disc in fluid form an adhesive, the vehicle of which contains ethyl acetate, cutting a center spot disc from said strip and depositing it upon the portion of the cushion disc having said fluid adhesive applied thereto, applying pressure to said center spot disc when depositing it upon said cushion disc, and thereafter applying a continuing pressure to said center spot disc by a presser plunger maintained at normal factory temperatures, whereby said center spot disc is applied to said cushion disc without subjecting the adhesive to an elevated temperature.

3. A method of making center spot crowns embodying therein feeding a strip of facing material in relation to cold cutting dies including a plunger die, said facing strip having on the under side thereof an adherent coating of a dry cellulose derivative adhesive soluble by ethyl acetate, distributing about the center of a cushion disc in fluid form a cellulose derivative adhesive, the vehicle of which contains ethyl acetate, cutting a center spot disc from said strip and depositing it upon the portion of the cushion disc having said fluid adhesive applied thereto, applying pressure to said center spot disc when depositing it upon said cushion disc, and thereafter applying a continuing pressure to said center spot disc by a presser plunger maintained at normal factory temperatures, whereby said center spot disc is applied to said cushion disc without subjecting the adhesive to an elevated temperature.

4. A method of making center spot crowns embodying therein feeding a strip of facing material in relation to cold cutting dies including a plunger die, said facing strip having on the under side thereof an adherent coating of a dry adhesive soluble by an admixture of ethyl acetate and toluene, distributing about the center of a cushion disc in fluid form an adhesive, the vehicle of which contains an admixture of ethyl acetate and toluene, cutting a center spot disc from said strip and depositing it upon the portion of the cushion disc having said fluid adhesive applied thereto, applying pressure to said center spot disc when depositing it upon said cushion disc, and thereafter applying a continuing pressure to said center spot disc by a presser plunger maintained at normal factory temperatures, whereby said center spot disc is applied to said cushion disc without subjecting the adhesive to an elevated temperature.

5. A method of making center spot crowns embodying therein feeding a strip of facing material in relation to cold cutting dies including a plunger die, said facing strip having on the under side thereof an adherent coating of a dry cellulose derivative adhesive soluble by an admixture of ethyl acetate and toluene, distributing about the center of a cushion disc in fluid form a cellulose derivative adhesive, the vehicle of which contains an admixture of ethyl acetate and toluene, cutting a center spot disc from said strip and depositing it upon the portion of the cushion disc having said fluid adhesive applied thereto, applying pressure to said center spot disc when depositing it upon said cushion disc, and thereafter applying a continuing pressure to said center spot disc by a presser plunger maintained at normal factory temperatures, whereby said center spot disc is applied to said cushion disc without subjecting the adhesive to an elevated temperature.

6. A method of making center spot crowns embodying therein feeding a strip of facing material in relation to cold cutting dies including a plunger die, said facing strip having on the under side thereof an adherent coating of a dry cellulose derivative adhesive containing a synthetic resin soluble by ethyl actate, distributing about the center of a cushion disc in fluid form a cellulose derivative adhesive containing a synthetic resin, the vehicle of which contains ethyl acetate, cutting a center spot disc from said strip and depositing it upon the portion of the cushion disc having said fluid adhesive applied thereto, applying pressure to said center spot disc when depositing it upon said cushion disc, and thereafter applying a continuing pressure to said center spot disc by a presser plunger maintained at normal factory temperatures, whereby said center spot disc is applied to said cushion disc without subjecting the adhesive to an elevated temperature.

7. A method of making center spot crowns embodying therein feeding a strip of facing material in relation to cold cutting dies including a plunger die, said facing strip having on the under side thereof an adherent coating of a dry cellulose derivative adhesive containing a synthetic resin soluble by an admixture of ethyl acetate and toluene, distributing about the center of a cushion disc in fluid form a cellulose derivative adhesive containing a synthetic resin, the vehicle of which contains an admixture of ethyl acetate and toluene, cutting a center spot disc from said strip and depositing it upon the portion of the cushion disc having said fluid adhesive applied thereto, applying pressure to said center spot disc when depositing it upon said cushion disc, and thereafter applying a continuing pressure to said center spot disc by a presser plunger maintained at normal factory temperatures, whereby said center spot disc is applied to said cushion disc without subjecting the adhesive to an elevated temperature.

JAY BERNARD EISEN.